United States Patent [19]

Maenza et al.

[11] Patent Number: 5,494,782
[45] Date of Patent: Feb. 27, 1996

[54] DIRECT TO STAMPER/MOTHER OPTICAL DISK MASTERING

[75] Inventors: Glenn J. Maenza, Glenn Mills, Pa.; Edward W. Morton, Lawrenceville, N.J.

[73] Assignees: Sony Corporation, Tokyo, Japan; Sony Music Entertainment, New York, N.Y.

[21] Appl. No.: 282,695

[22] Filed: Jul. 29, 1994

[51] Int. Cl.⁶ .................................................. G11B 7/26
[52] U.S. Cl. ..................... 430/321; 430/320; 430/945; 264/2.5; 264/107; 205/70
[58] Field of Search .................................. 430/320, 321, 430/945; 264/107, 2.5; 205/70

[56] References Cited

U.S. PATENT DOCUMENTS

| | | | |
|---|---|---|---|
| 3,980,818 | 9/1976 | Browning | 369/32 |
| 4,430,401 | 2/1984 | Wilkinson | 430/8 |
| 4,729,940 | 3/1988 | Nee et al. | 430/323 |

OTHER PUBLICATIONS

English Language Abstract of JP 63–298731, Nose, Dec. 1988.
Topics in Applied Physics, "Tunable Paramagnetic–Ion Solid–State Lasers," John C. Walling, vol. 59: Tunable Lasers, Springer–Verlag Berlin Heidelberg, 1987, pp. 331–375.

Primary Examiner—Charles L. Bowers, Jr.
Assistant Examiner—John A. McPherson
Attorney, Agent, or Firm—Peter C. Toto; Jerry Miller

[57] ABSTRACT

A method and apparatus for creating an optical disk mother or stamper wherein the number of processing steps is greatly reduced from the prior art methods. In particular, the present invention involves directly forming a mother or stamper by direct laser ablation of a conductive metal substrate. More specifically, a stream of coded digital information (for example, representing the content of an encyclopedia in the case of CD ROM or a classical music collection in the case of CD audio) is converted into a corresponding plurality of pits and lands in the conductive metal substrate by electronically switching the beam of a first laser on and off via an electro or acusto-optic modulator (EOM/AOM) in response to the digital information. As a result, selective portions of the conductive substrate are either ablated (in the case where the laser is on) thereby directly creating the pits, or the substrate is left unaltered (in the case where the laser is off) thereby creating lands. These pits and lands correspond to the digital information and can be read to reproduce the same. The ablated substrate can then be used as a mother. Advantageously, no coating need first be applied to the surface of the substrate before ablation.

34 Claims, 3 Drawing Sheets

DIRECT TO STAMPER/MOTHER OPTICAL DISK MASTERING

FIELD OF THE INVENTION

The present invention relates to optical disk mastering and more particularly to optical disk mastering wherein the stamper or mother is formed directly by laser ablation of a metal substrate.

BACKGROUND OF THE INVENTION

In order to mass produce optical disks such as those of the compact disk family (e.g., CD Audio, CD ROM, Video CD, CD-I, CD-MO, MD, etc.) a reliable mastering process is required. However, present day compact disk mastering techniques involve numerous complicated and time consuming steps. FIG. 1 depicts the basic processing steps. The first step involves providing a circular glass substrate 12 approximately nine and one-half inches in diameter that must be cleaned and dried and then carefully inspected (visually) for imperfections, surface smoothness and the like. An adhesive layer coating (not shown) is then placed on one surface of the glass 12 to exacting tolerances followed by a photo-resistive coating 22 over the adhesive layer as shown in step 20. This photo-resistive coating 22 must also be carefully inspected to insure that it is evenly and continuously applied throughout the surface of the substrate 12. Dropout scanning is next typically performed to insure that the photo-resistive coating is properly applied. The glass substrate must then be appropriately cured and the thickness sampled to insure the close tolerances are met. The steps of applying the coating to the substrate require significant time and must be precisely performed.

After curing, in step 30 laser beam recording (LBR) takes place. LBR involves the selective exposure of the photo-resistive coating to the beam of a laser 32 in order to form the appropriate pattern of pits and lands. The laser 32 is typically a continuous wave laser with exposure of its beam to the photo-resistive coating 22 conventionally controlled by an acusto-optic modulator (AOM) (not shown).

The AOM acts as an electronic shutter to the laser beam and, as well-known by those skilled in the art, is controlled by a string of binary 1's and 0's generated by an encoder (also not shown). The encoder converts, for example, stereo audio signals typically recorded digitally on ¾ inch U-matic tape in a video format to the appropriate binary 1's and 0's by performing eight-to-fourteen modulation (EFM). As part of this encoding, the encoder generates so-called RS parity bytes and adds merging bits.

After the photo-resistive coating 22 has been selectively exposed to the laser as described above, the photo-resistive coating 22 must next be developed so that the exposed portions can be removed. Developing is accomplished in step 40 by placing the substrate 12 in a caustic sodium hydroxide solution. Again, after developing the glass must be inspected. This time by measuring the diffraction orders of the tracks, among other things.

The next step 50 is a metalization step and involves placing a thin coating of silver or nickel 52 over the entire surface of the substrate 12 such that it follows the pattern of pits and lands of the now developed photo-resistive layer 22. In the case of silver, this is accomplished by well-known evaporation techniques. The evaporation results in the formation of the metal coating 52 typically 120 nanometers thick. At this point, the metalized substrate or the "glass master" is typically "played" in a specially adapted CD player to insure that the pits have been properly formed. It is only at this point, after the time and expense of each of the above steps, that the accuracy of the recording can be determined. Additionally, a visual inspection takes place to further confirm the accuracy of the production.

In steps 60 and 70, a nickel plating 62 is formed via electroplating over the metalized glass such that a metal master 64, with pits and lands the inverse of the metalized glass plate, is formed when it is removed from the substrate. This metal master is also known as a "father" and is formed by well-known electroplating procedures. Again, another inspection is required at this point to insure the father has been properly formed. As the extremely thin silver or nickel metalization 52 forming the glass master is lost to the father by the nickel plating, there can only be one father.

From the metal master or father 64, a so-called "mother" 82 is formed also out of nickel as shown in step 80. The mother 82 is simply the inverse of the metal master or father and is similarly formed by electroplating. Several mothers can be formed from the metal master or father, however, each must be inspected to insure that it has been properly formed.

Up to this point in the process there have been no less than six detailed inspections involving numerous processing steps. In particular, the processing steps up to this point typically require seven to nine manpower hours.

Finally, in step 90 nickel stampers 92 are formed from the mothers 82. The stampers 92 are again simply an inverse of the mother 82 formed by electroplating the same. From the stampers, compact disks can be manufactured by injection molding melted resin, e.g., optical quality polycarbonate, at high pressure into a mold comprising the stamper and allowing it to solidify.

As can be observed from the above-steps, before mothers 82 or stampers 92 are formed, numerous steps must be undertaken. Because only small variations in process conditions, equipment alignment, etc., can result in failure of the entire process, yields tend to be less than ideal.

One alternative known by those skilled in the art involves reducing the required number of steps to reach the mother and, therefore, the stamper stage. This alternative, however, begins with first placing a coating over the glass substrate and thus involves steps analogous to steps 10 and 20 as described above. Specifically, a glass substrate 12 is first provided, cleaned, dried and inspected thoroughly. Then a coating is placed along one surface of the glass substrate 12 and cured. However, in this case the coating is a non-photo-resistive coating compared to the photo-resistive coating 22 of FIG. 1. Next, the coating is selectively subjected to a laser beam. Instead of merely exposing the coating as described in step 30 above, the laser beam in this case actually vaporizes the coating. Thus, pits are formed (and lands are left) directly in the non-photo-resistive coating. Accordingly, there is no need for developing and step 40 can be skipped. Furthermore, because the pits are actually formed at this stage, i.e., there is a physical or mechanical change of the coating, a read laser immediately down-stream from the recording laser, i.e., the laser vaporizing selective portions of the coating, can be used to verify the accuracy of the vaporization process by reading or "playing" the disk. Thus, if a serious mistake is made at this early stage, the process can immediately be aborted without having to complete the same. Additionally, this laser allows feedback to control exposure, power and other beam parameters of the recording (ablating) laser. While this alternative technique eliminates some processing time, for example, developing, the glass substrate still must be coated and creation of the father or metal master 64 (steps 60 and 70) must still take place before mothers 82 or stampers 92 can be formed.

Finally, another alternative known by those skilled in the art is to apply a conductive coating to a glass substrate and perform direct laser ablation of this conductive coating. While this alternative avoids the need for metalizing with silver, for example, the troublesome and time consuming steps of properly applying the coating still must be undertaken. Accordingly, it would be advantageous to be able to directly form mothers or stampers directly via laser ablation of a conductive substrate.

SUMMARY OF THE INVENTION

A method and apparatus for creating an optical disk mother or stamper is disclosed wherein the number of processing steps is greatly reduced from the prior art methods. In particular, the present invention involves directly forming a mother or stamper by direct laser ablation of a conductive metal substrate. More specifically, a stream of coded digital information (for example, representing the content of an encyclopedia in the case of CD ROM or a classical music collection in the case of CD audio) is converted into a corresponding plurality of pits and lands in the conductive metal substrate by electronically switching the beam of a first laser on and off via an electro or acusto-optic modulator (EOM/AOM) in response to the digital information. As a result, selective portions of the conductive substrate are either ablated (in the case where the laser is on) thereby directly creating the pits, or the substrate is left unaltered (in the case where the laser is off) thereby creating lands. These pits and lands correspond to the digital information and can be read to reproduce the same. The ablated substrate can then be used as a mother. Advantageously, no coating need first be applied to the surface of the substrate before ablation.

From the mother, a plurality of stampers can be formed in conventional fashion by repeatedly electroplating and removing the electroplating material from the ablated conductive substrate. From the stampers, a plurality of plastic optical disks can be formed by using the stampers in an injection molding process.

Preferably, the conductive substrate is nickel and the first laser is an alexandrite laser operating in a Q-switched, mode-locked state. This type of laser operating as described insures that sufficient power is available for creating the width and depth of pit required. Additionally, due to the high repetition rate and peak output power, the alexandrite laser allows for real-time mastering (or better than real-time mastering).

The substrate could alternatively be silver or another conductive metal amenable to the described laser ablation and capable of use as a stamper or mother. Additionally, a different laser could be employed; as long as the laser has sufficient output characteristics to ablate the substrate as described herein.

In another embodiment, the ablated conductive substrate is created directly in the form of a stamper allowing for the formation of a plurality of plastic optical disks by using it directly in an injection molding process.

In still another embodiment, a second laser, downstream from the first laser, is employed to read the pits and lands formed by the first laser immediately after the pits and lands are formed on the conductive substrate. The information read by this second laser can be provided to the first laser in a feedback loop so that various parameters of the ablation performed by the first laser, e.g., exposure power and other beam parameters, can be controlled.

DETAILED DESCRIPTION OF THE INVENTION

Figure 1:
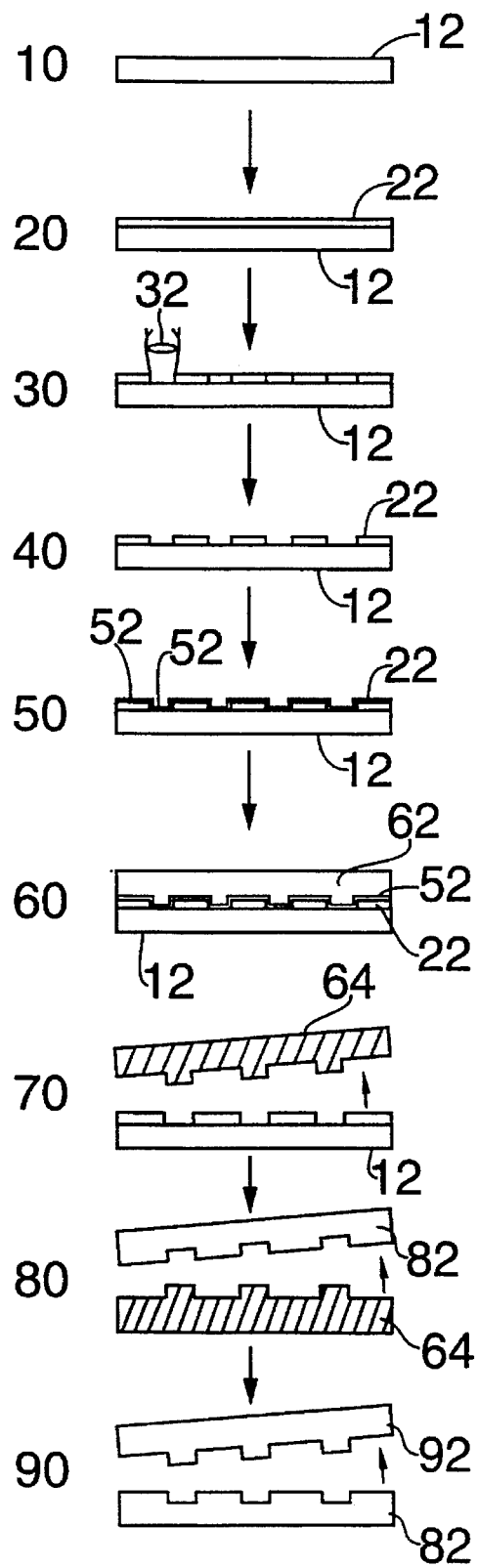
FIG. 1 is a diagram of the steps required in the prior art compact disk mastering process.
Figure 2:
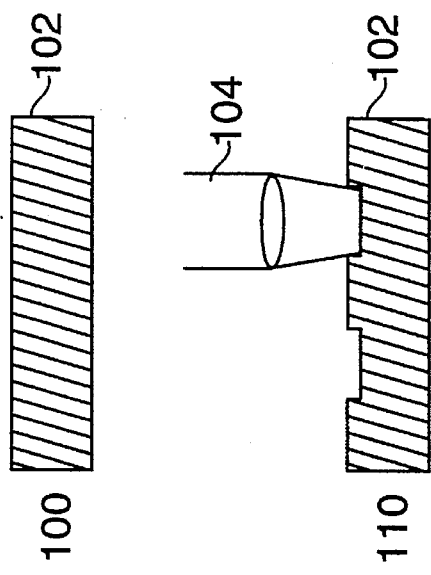
FIG. 2 is a diagram of the steps required in the compact disk mastering process of the present invention.

FIG. 2 shows the basic processing steps of the present invention. In particular, a conductive substrate 102, preferably nickel, is provided in step 100. The substrate is first inspected for surface smoothness, flatness and the like. In the next step 110, the conductive substrate is subjected to laser ablation by a laser 104 directly forming the pits (and leaving lands) in the substrate. The laser 104 is controlled by an EOM/AOM in a similar fashion to the laser 32 of FIG. 1.

While the prior art technique for exposing the photoresistive coating employs an argon ion laser, this type of laser is not suitable for laser ablation of a metal substrate. In particular, that type of laser lacks the power required for such a task. An alternative for performing the laser ablation of the metal substrate could be a so-called excimer laser. This laser presents a sufficient power profile for the task. However, not only is the power requirement crucial to this task, but so too are the repetition rate and duty cycle. The repetition rate is how long it takes the laser to recharge and directly effects the amount of LBR time necessary. Present LBR techniques allow for desirable real-time recording, e.g., 1.25 m/sec. constant linear velocity. The amount of sub-real-time LBR required makes a process less desirable due to increased time and expense in operating the equipment. Conversely, if recording can take place on a better than real-time rate, a process is more desirable. The excimer laser is a so-called switched laser capable of switching on or pulsing for only a predetermined period of time after which it must recharge (in contrast, the argon ion laser is a continuous wave laser). Unfortunately, the excimer laser lacks the required repetition rate and the appropriate duty cycle for performing the task of compact disk mastering due to the extremely small sizes of the pits and lands and the desire to perform real time mastering. For example, the duty cycle of such an excimer laser is typically 1% or less.

One solution to this problem would be to use a multiple excimer laser array. However, such an array, while curing the duty cycle problem, would not necessarily cure the repetition rate problem and certainly adds expense to the project.

A laser particularly suited for use with the present invention is a so-called alexandrite laser. An example of such a laser is the LAI 101 manufactured by Light Age, Inc. In particular, as known by those skilled in the art, the alexandrite laser is capable of providing pulses of nearly any duration from picoseconds to milliseconds. The alexandrite laser is also capable of operating in a so-called Q-switched, mode-locked state, producing extremely high repetition rates, in the order of 100 MHz, and high peak powers. Operating as such, the alexandrite laser is considered a continuous wave laser and appears to the substrate as such. Additionally, because of the narrow pulse width, peak power sufficient to ablate a nickel substrate is obtainable. Notwithstanding, amplifiers are also available for the alexandrite lasers that double the laser output at most wavelengths. Accordingly, it has been found that such lasers are clearly sufficient to perform the metal ablation needed for the direct mastering described above.

Figure 3:
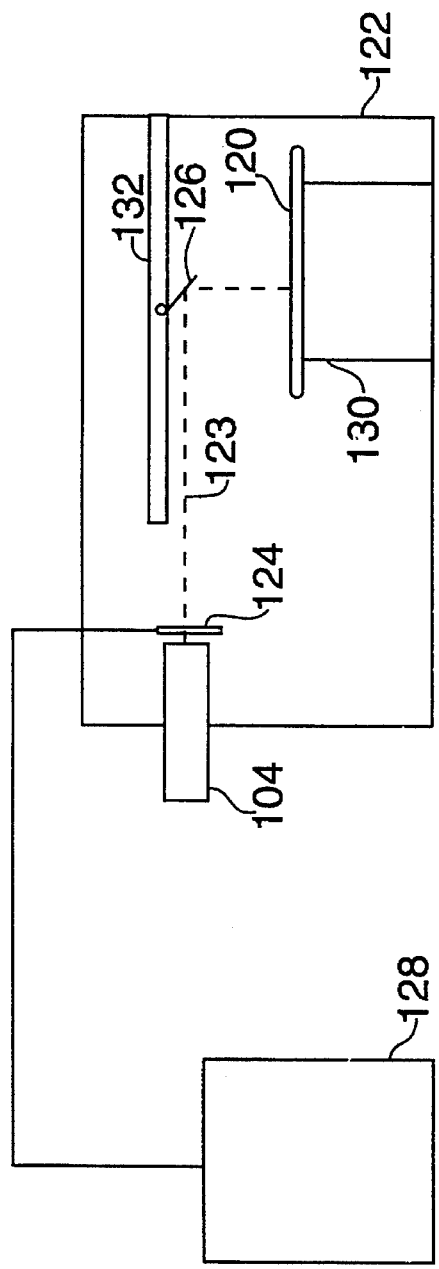
FIG. 3 is a representation of an arrangement used to perform compact disk mastering in accord with the present invention.

FIG. 3 shows an arrangement employing an alexandrite laser 104 for direct formation of a mother. If a stamper rather than a mother is to be directly formed, rotation of the substrate would have to be reversed from that used for the mother. Note that the arrangement shown in FIG. 3 is not meant to physically depict an actual set-up, but is a mere schematic representation of the same. The details are within the purview of one of ordinary skill in the art.

As shown in FIG. 3, a conductive metal substrate 120, preferably nickel, is provided. The substrate is the same as that shown in FIG. 2, item 102. The alexandrite laser 104 is arranged such that its pulsed beam 123 is switched by an EOM/AOM 124 before reaching a corner reflector 126 which reflects the beam to the substrate 120. The EOM/AOM 124 acts as an electronic shutter to the beam 123 and is controlled by the output of an encoder 128 in a conventional fashion, i.e., in the same fashion as an argon ion laser presently used to develop a photo resist coating would be controlled.

Because the process of creating pits in the substrate 120 via laser 104 at a constant linear velocity (1.25 m/sec. in the case of real time mastering) typically requires relative angular and radial motion between the focal point of the beam 123 and the substrate 120, the substrate 120 is arranged on a rotating platform 130 and is fixed in all other respects. Radial translation takes place by movement of the corner reflector 126 along track 132 thereby moving the focal point of the beam 123 radially across the substrate. All motion is controlled in conventional fashion by processing means (not shown) which is also coupled to the encoder 128 and rotating platform 130. This type of arrangement, other than the use of a laser to perform direct ablation of a conductive metal substrate, is well-known by those skilled in the art and is typically used in present CD mastering, i.e., developing or ablating a coating. The only other substantial modifications from the prior art required to perform direct laser ablation of a conductive metal substrate are to provide the alexandrite laser 104 operating in a Q-switched, mode-locked state instead of a conventional laser, and to employ a vacuum, magnetic or other suitable means to remove vaporized substrate in addition to a standard "clean room" type of chamber.

As described above, the EOM/AOM 124 acts as an electronic shutter to the beam 123 generated by the alexandrite laser 104. Thus, based on the output of the encoder 128, which is the binary 1's and 0's representative of coded information to be recorded on the disk, the beam 123 is either allowed to pass to the corner reflector 126 and thus to the substrate 120 thereby ablating the substrate and creating pits, or is prevented from traveling to the corner reflector 126 and to the substrate 120 thereby leaving lands (the linear velocity of the disk being constant). When the pits are created by ablation of the substrate, a vapor is formed. In order to prevent this vapor from depositing back on the substrate in an undesirable fashion, a vacuum or magnetic means is employed to remove it immediately from the area. This type of chamber is also well-known by those skilled in the art. Note again that the arrangement shown herein is merely a schematic representation, the actual arrangement is far more sophisticated, including use of complex electronic and mechanical devices well known to those skilled in the art.

Figure 4:
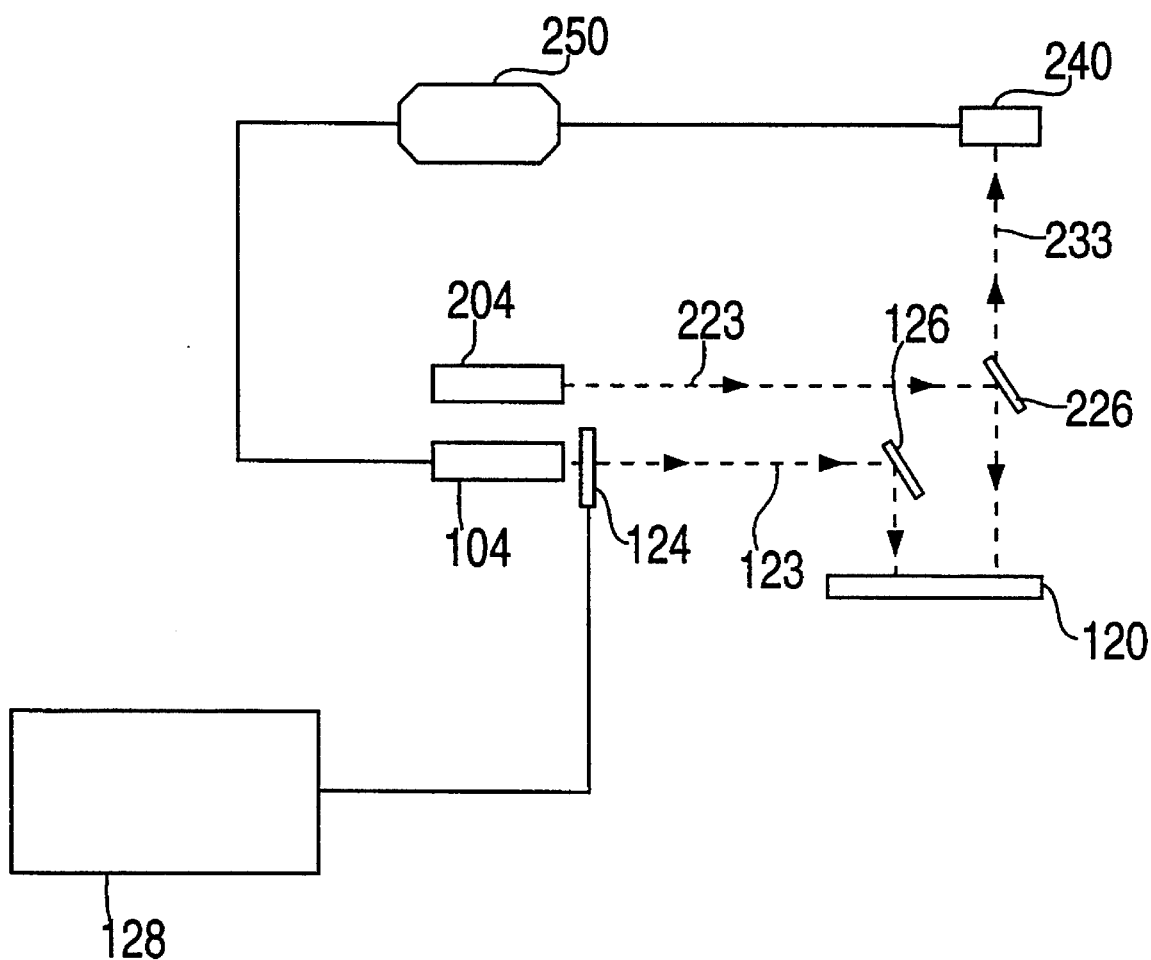
FIG. 4 is an alternative representation of an arrangement used to perform compact disk mastering in accord with the present invention.

FIG. 4 shows an alternative embodiment of the present invention where like numbers correspond to like elements in FIGS. 2 and 3 (certain elements from FIG. 3 have been omitted for purposes of clarity). In this embodiment a second laser 204 is employed to read or play the metal master 120 immediately after it is recorded (ablated). The second laser 204 is preferably a 560 nanometer diode laser and performs a similar function to those lasers found in conventional home CD players. The reflection 233 of the second laser's beam 223 from the substrate 120 is measured by a photodetector 240. The second laser 204 could be directly behind the first laser and is used to play the pits and lands just formed by the first laser 104. By playing the disk immediately after it is formed, it can be verified whether the information has been accurately formed in the substrate. If not, the entire process can be stopped mid-stream, thereby obviating the problem found in some prior art devices of having to first record the entire disk before any indication of the accuracy of the process is provided.

Furthermore, the second laser could be used in a feedback arrangement via a micro-controller 250 as shown to provide adjustments to the first laser 104, e.g., adjustments relating to the exposure, power, etc. of the beam and the desired rectangular profile of the pits, slope of the pits, depth of the pits, etc. This would help to ensure a more accurate process.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method for manufacturing an optical disk master wherein a stream of digital information is converted to a plurality of pits and lands in the optical disk master representative of the digital information, comprising the steps of:

providing a conductive substrate;

moving a focal point of a beam of a first laser operating in a mode-locked state over a surface of the conductive substrate in a pattern so as to allow for the formation of the pits and lands; and controlling the exposure of the beam to the conductive substrate with the digital information as the focal point of the beam is being moved such that exposed portions of the conductive substrate are directly ablated thereby creating the pits, and unexposed portions of the conductive substrate are unaltered thereby creating the lands.

2. The method according to claim 1 further comprising the step of:

forming a plurality of plastic optical disks by using the ablated conductive substrate as a stamper in an injection molding process.

3. The method according to claim 1 further comprising the steps of:

electroplating the ablated conductive substrate with a conductive metal;

removing the electroplating material; and forming a plurality of plastic optical disks by using the removed electroplating material as a stamper in an injection molding process.

4. The method according to claim 3 wherein a plurality of stampers are formed by repeatedly electroplating and removing the electroplating material from the ablated conductive substrate.

5. The method according to claim 4 wherein the electroplating material is nickel.

6. The method according to claim 1 wherein the conductive substrate is nickel.

7. The method according to claim 1 wherein the conductive substrate is silver.

8. The method according to claim 1 wherein movement of the focal point of the beam of the first laser is accomplished by rotating the conductive substrate and simultaneously translating the beam of the first laser radially.

9. The method according to claim 8 wherein the linear velocity of the focal point on the conductive substrate is constant.

10. The method according to claim 9 wherein the constant linear velocity is approximately 1.25 meters per second.

11. The method according to claim 9 wherein the constant linear velocity is greater than 1.25 meters per second.

12. The method according to claim 1 further comprising the step of:

reading the pits and lands created by the first laser with a second laser before all of the pits and lands are created in the conductive substrate.

13. The method according to claim 12 wherein the information read by the second laser is provided to the first laser in a feedback loop so that parameters of the ablation performed by the first laser can be controlled.

14. The method according to claim 12 wherein the pits and lands are read by the second laser immediately after they are created by the first laser.

15. The method according to claim 1 wherein the first laser is further operating in a Q-switched state.

16. A method for manufacturing an optical disk master wherein a stream of digital information is converted to a plurality of pits and lands in the optical disk master representative of the digital information, comprising the steps of:

providing a conductive substrate;

moving a focal point of a beam of an alexandrite laser over a surface of the conductive substrate in a pattern so as to allow for the formation of the pits and lands; and controlling the exposure of the beam to the conductive substrate with the digital information as the focal point of the beam is being moved such that exposed portions of the conductive substrate are directly ablated thereby creating the pits, and unexposed portions of the conductive substrate are unaltered thereby creating the lands.

17. The method according to claim 16 further comprising the step of:

forming a plurality of plastic optical disks by using the ablated conductive substrate as a stamper in an injection molding process.

18. The method according to claim 16 further comprising the steps of:

electroplating the ablated conductive substrate with a conductive metal;

removing the electroplating material; and forming a plurality of plastic optical disks by using the removed electroplating material as a stamper in an injection molding process.

19. The method according to claim 18 wherein a plurality of stampers are formed by repeatedly electroplating and removing the electroplating material from the ablated conductive substrate.

20. The method according to claim 19 wherein the electroplating material is nickel.

21. The method according to claim 16 wherein the conductive substrate is nickel.

22. The method according to claim 16 wherein the conductive substrate is silver.

23. The method according to claim 16 wherein the exposure of the beam of the alexandrite laser is controlled by an electro-optic modulator.

24. The method according to claim 16 wherein the exposure of the beam of the alexandrite laser is controlled by an accost-optic modulator.

25. The method according to claim 16 wherein the alexandrite laser is operated in a mode-locked state.

26. The method according to claim 25 wherein the alexandrite laser is further operated in a Q-switched state.

27. The method according to claim 25 wherein the pulse width of the alexandrite laser is less than one nanosecond.

28. The method according to claim 16 wherein movement of the focal point of the beam of the alexandrite laser is accomplished by rotating the conductive substrate and simultaneously translating the beam of the alexandrite laser radially.

29. The method according to claim 28 wherein the linear velocity of the focal point on the conductive substrate is constant.

30. The method according to claim 29 wherein the constant linear velocity is approximately 1.25 meters per second.

31. The method according to claim 29 wherein the constant linear velocity is greater than 1.25 meters per second.

32. The method according to claim 16 further comprising the step of:

reading the pits and lands created by the alexandrite laser with a second laser before all of the pits and lands are created in the conductive substrate.

33. The method according to claim 32 wherein the information read by the second laser is provided to the alexandrite laser in a feedback loop so that parameters of the ablation performed by the first laser can be controlled.

34. The method according to claim 33 wherein the pits and lands are read by the second laser immediately after they are created by the alexandrite laser.

* * * * *